United States Patent [19]
McGrath et al.

[11] Patent Number: 5,636,095
[45] Date of Patent: Jun. 3, 1997

[54] REMOVABLE DISK TO DRIVE ENGAGEMENT

[75] Inventors: Michael C. McGrath, Pleasanton; Joseph C. Cardona, San Jose; Dan Cautis, San Mateo, all of Calif.

[73] Assignee: Avatar Systems Corp., Milpitas, Calif.

[21] Appl. No.: 225,737

[22] Filed: Apr. 11, 1994

[51] Int. Cl.⁶ .................................................. G11B 23/03
[52] U.S. Cl. ............................................................. 360/133
[58] Field of Search ............................... 360/133, 98.08, 360/99.05, 99.12; 369/282, 291

[56] References Cited

U.S. PATENT DOCUMENTS

| | | | |
|---|---|---|---|
| 4,477,894 | 10/1984 | Churman | 369/291 |
| 4,847,826 | 7/1989 | Sakaguchi et al. | 360/133 |
| 4,935,834 | 6/1990 | Muehlhausen | 360/133 |
| 5,031,065 | 7/1991 | Flor et al. | 360/132 |

FOREIGN PATENT DOCUMENTS 94482  4/1988  Japan ....................................... 360/133

Primary Examiner—Stuart S. Levy
Assistant Examiner—George J. Letscher
Attorney, Agent, or Firm—George W. Finch

[57] ABSTRACT

An engagement interface between a removable cartridge containing a rigid disk for storage of data and a disk drive. The cartridge includes an opening for a hub of the disk for spinning and the disk drive has a magnetic spindle with connecting mechanism for extending the spindle into contact with the hub and retracting it out of contact. The cartridge also includes a disk immobilizer to hold the disk with its hub centered in the opening when the cartridge is outside the disk drive, and a detachable mechanical interconnection between the hub and the housing to retain the hub generally centered in the opening when the disk immobilizer is deactivated as the cartridge is inserted in the disk drive but before the spindle has engaged the hub for instances when the cartridge is inserted in the disk drive with other than a vertical orientation.

19 Claims, 11 Drawing Sheets

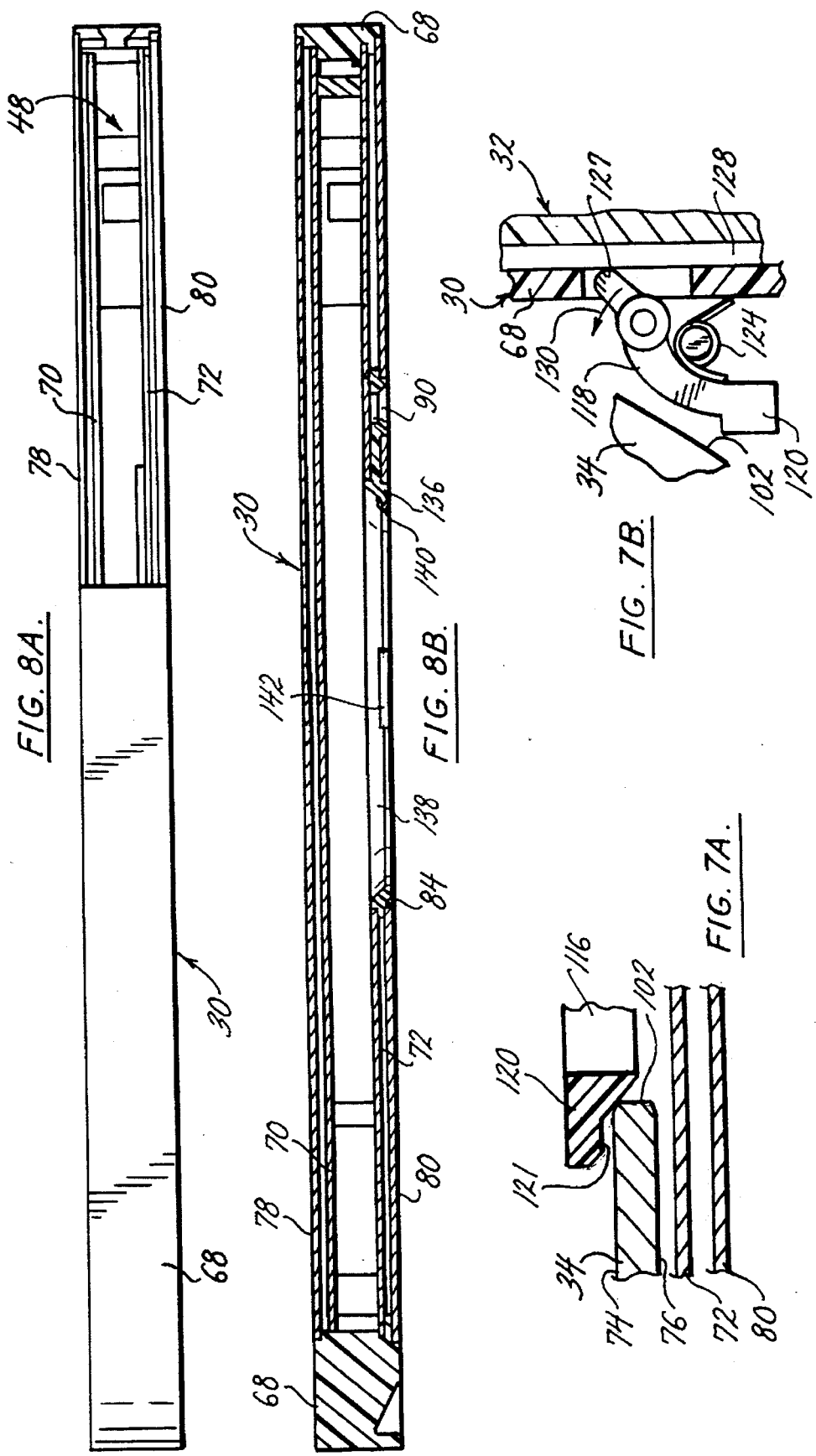

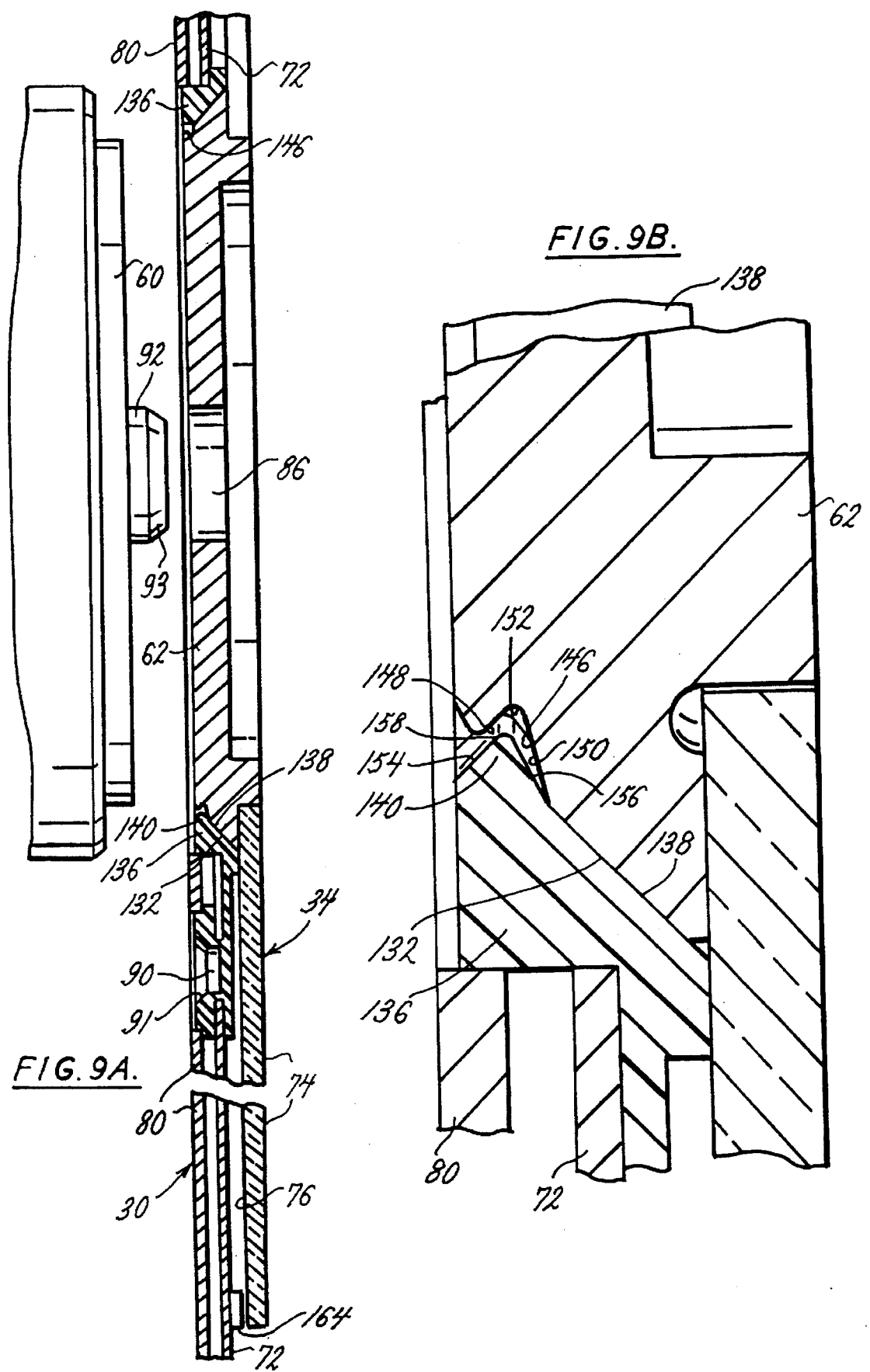

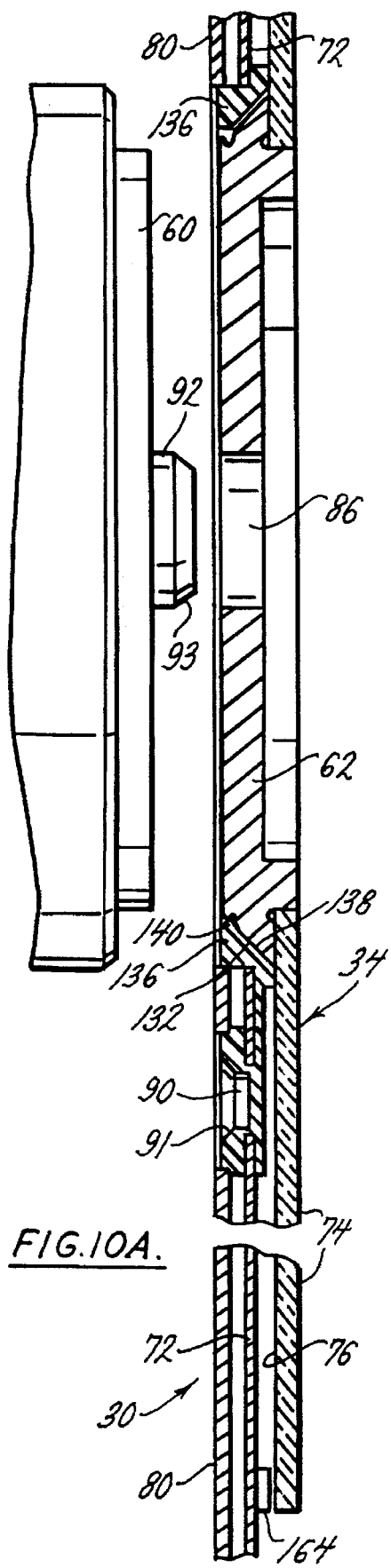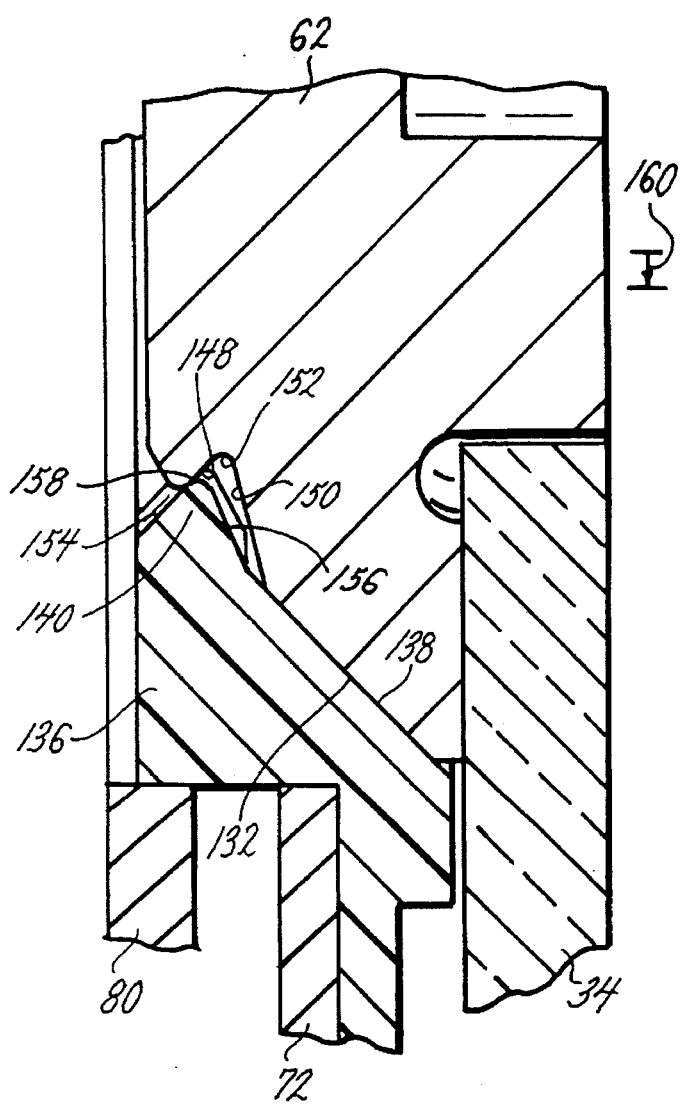
FIG.10A.
FIG.10B.

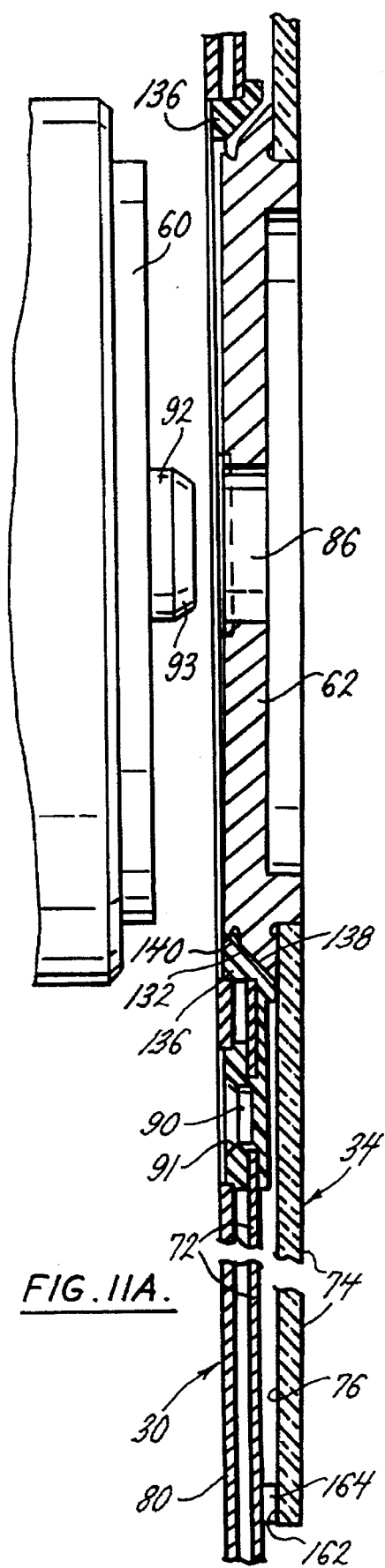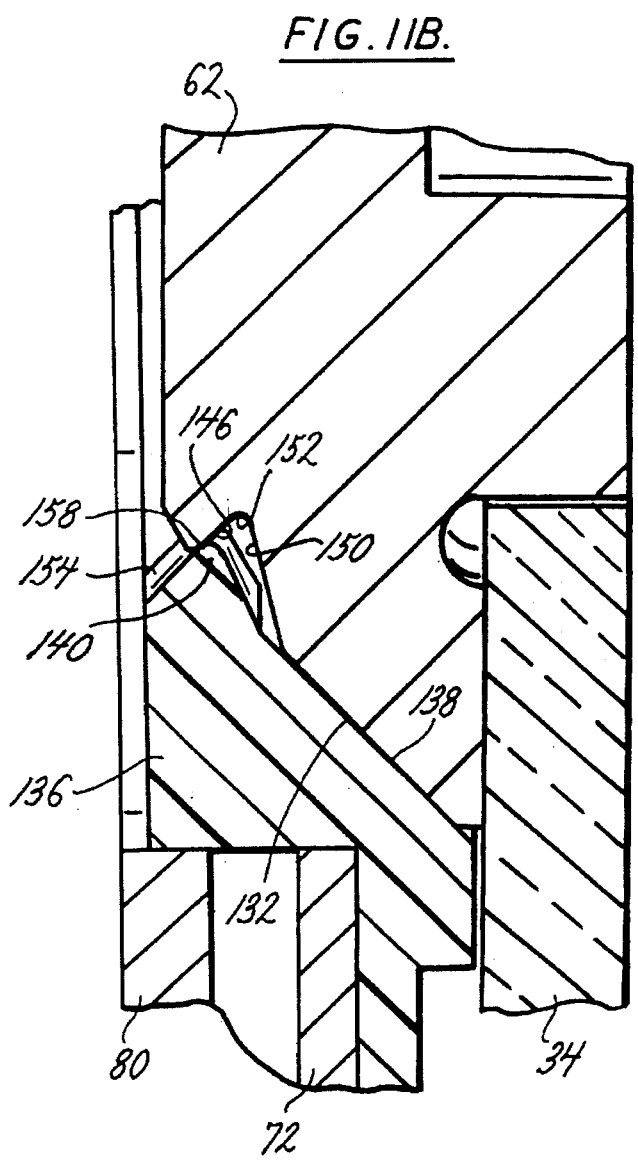

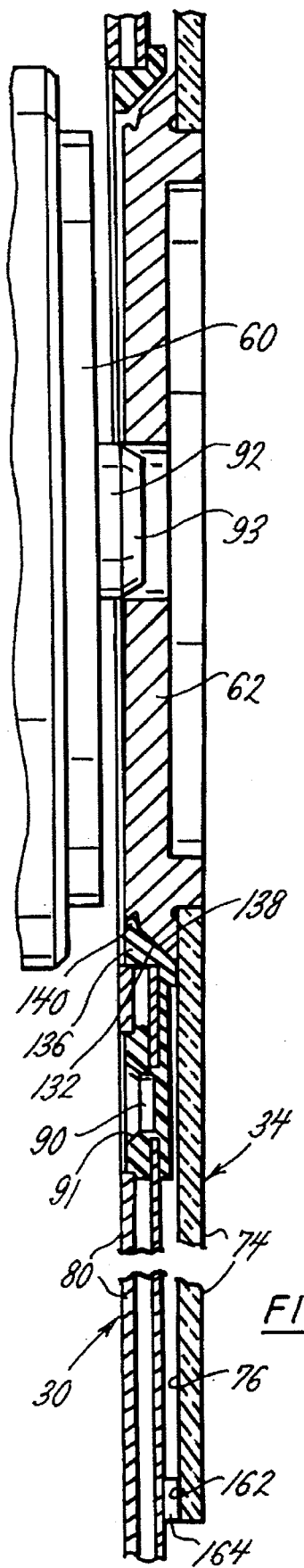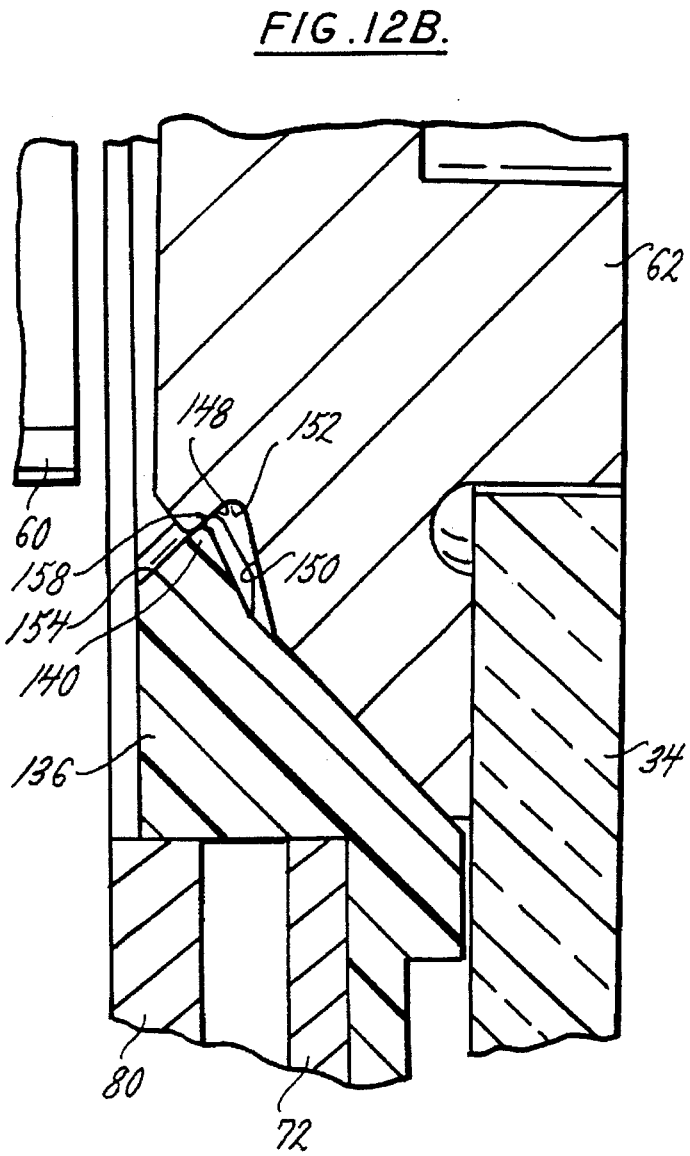
FIG.12A.
FIG.12B.

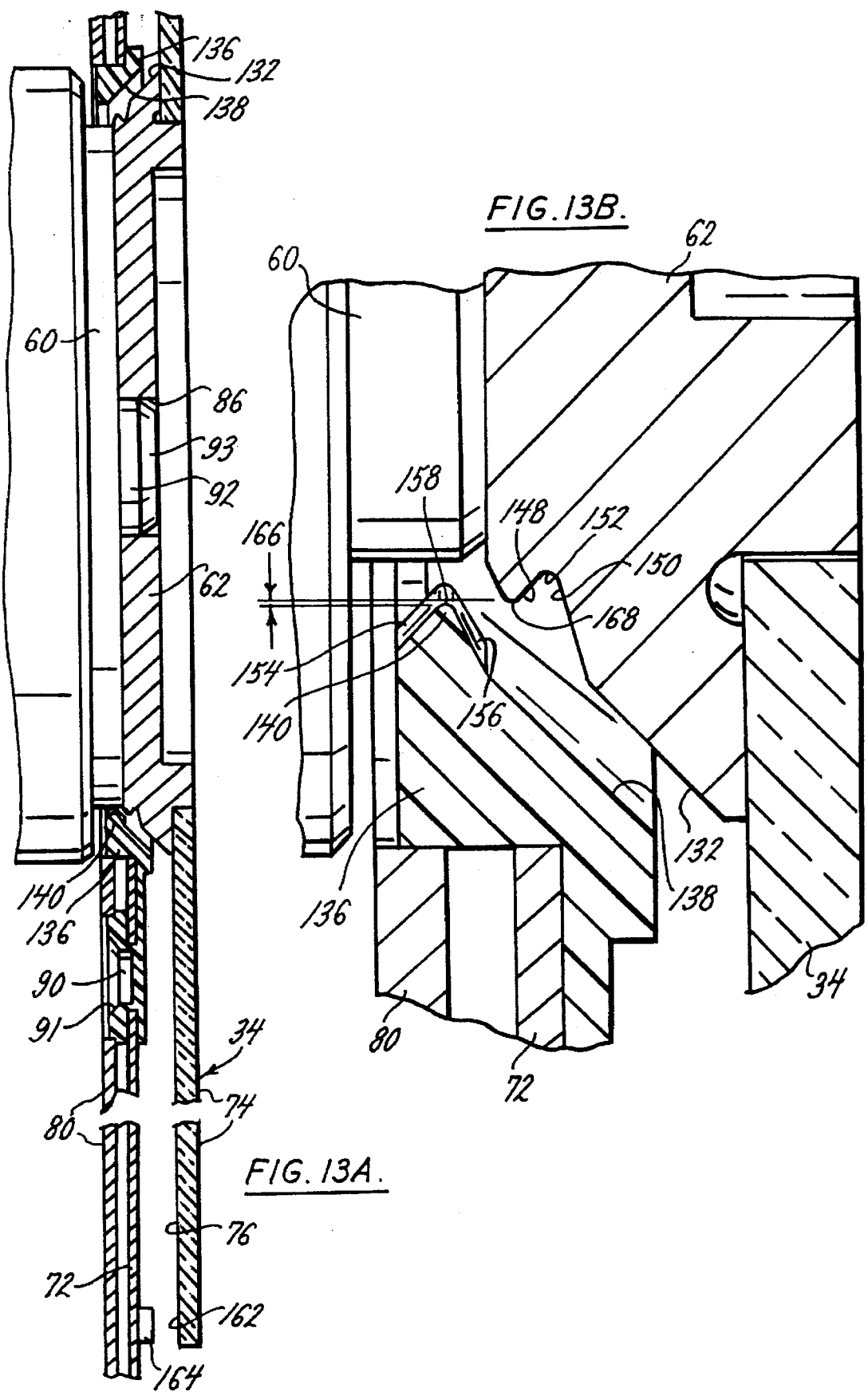

REMOVABLE DISK TO DRIVE ENGAGEMENT

FIELD OF THE INVENTION

The present invention relates to disk drives with removable cartridges containing relatively rigid media to store data in a personal computer.

BACKGROUND OF THE INVENTION

Removable disks included in protective cartridges have been available for some time. Generally, the protective cartridges include either a flexible disk or a relatively rigid disk. Typical flexible disk cartridges as shown in U.S. Pat. No. 4,445,155 to Takahashi, et al.; U.S. Pat. No. 4,445,157 to Takahashi; U.S. Pat. No. 4,546,397 to Asami, et al; U.S. Pat. No. 4,573,093 to Obama, et al; and U.S. Pat. No. 4,675,758 to Tanaka. Rigid disk cartridges are shown in U.S. Pat. No. 4,488,187 to Alaimo; U.S. Pat. No. 4,503,474 to Nigam; U.S. Pat. No. 4,504,879 to Toldi, et al.; U.S. Pat. No. 4,683,506 to Toldi, et al.; U.S. Pat. No. 4,717,981 to Nigam, et al; U.S. Pat. No. 4,722,012 to Toldi, et al.; U.S. Pat. No. 4,684,452 to Thompson, et al.; U.S. Pat. No. 4,870,518 to Thompson, et al.; U.S. Pat. No. 4,864,437 to Couse, et al.; U.S. Pat. No. 4,920,462 to Couse, et al.; U.S. Pat. No. 4,965,685 to Thompson, et al.; and U.S. Pat. No. 4,965,691 to Iftikar, et al. Although optical disks are possible, usually such flexible (floppy) and rigid (hard) disks are coated with suitable magnetic media, for writing data and reading data therefrom. Each disk is surrounded by a housing designed to prevent contamination or damage to the magnetic media of the disk. Some floppy disk cartridges just have a window to allow access, but for a rigid or hard disk cartridge, the housing must have an access shutter or other type of door to prevent contamination or damage. The shutter is opened when the cartridge is inserted into a disk drive mechanism, to allow the read/write heads access to the disk, and closed when the cartridge is ejected. The heads move in and out linearly or accurately across the disk. In floppy disk drives, the heads are designed to lightly touch the magnetic media. In hard disk drives, the heads float on a thin layer of air so they never touch the disk while it is spinning. Because of the head contact, floppy disks tend to wear out after a short time and the drives occasionally need their heads cleaned, while hard disks can last the lifetime of the computer to which they are connected. In hard disk drives, environmental contamination may be reduced by providing seals about the access shutter and adjacent a hub used to spin the disk.

Generally, the requirements for a disk cartridge are: protect the disk from damage and contamination, provide access for the read/write heads on both sides of the contained disk, provide access for drive means to spin the disk, provide rigidity sufficient to assure that normal stresses do not cause the housing to bend and come into contact with the disk, and do all of this in minimum volume. In addition, some sort of mechanism is usually provided to retain the shutter closed except when the cartridge is in the relative clean and safe environment within a disk drive. Cartridges typical of those available in the prior art are disclosed in U.S. Pat. Nos. 4,864,452 and 4,503,474. The cartridge arrangement shown in the '474 patent is for use with a disk drive containing heads that are movable in relationship to the disk by means of a linear device, such as a stepper motor or a linear voice coil motor, which are generally expensive and not particularly versatile or fast. The cartridge shown in the '452 patent is for use with a radial arm voice coil actuator which is economical and efficient, but requires a larger opening and are more difficult to align from drive to drive.

The housings of hard disk cartridges tend to be constructed from plastic or fiber material which must be relatively thick to withstand day-to-day abuse. The housing also must be relatively thick to support a shutter and to allow the insertion of the read/write heads within the sides thereof. The shutter of such housings usually open an edge because they cannot provide enough structural support to allow a corner to be missing. The resulting cartridges are bulky, heavy and have dimensions which are too big to fit into a shirt pocket.

Modern floppy disk drives merely require insertion of a cartridge through a slot and motors and/or solenoids within the drive thereafter properly position the cartridge in the drive. In some instances, a knob must be manipulated to connect a rotational drive motor to the disk and to bring the heads into contact with the magnetic media. Removable cartridge hard disk drives use similar motors and solenoids, but usually require the manipulation of a lever to seat and eject the cartridge, and to open and close the shutter. The motors and solenoids use electrical power, and cause excessive current drain too excessive for battery powered laptop and notebook personal computers.

Therefore, there has been a need to provide a disk drive with a removable cartridge which is small and thin, is capable of operating quickly at extremely high data densities, which uses almost no electrical power for cartridge insertion and ejection, and can reliably establish a mechanical interface between the disk within the cartridge and the disk drive no matter what the orientation of the cartridge with respect to gravity without requiring a complex series of manual manipulations.

SUMMARY OF THE INVENTION

The present invention is an improved mechanical interface between a small, thin, high density, hard disk within a protective cartridge and a disk drive. The cartridge includes the hard disk, which is mounted for spinning within a housing.

Prototype models of the present disk drive, with its matching cartridge, allow the storage of over 120 megabytes of data with less than 15 milliseconds average access time. The cartridge requires a generally rectangular area, about 2¾" wide by 3" deep by ³⁄₁₆" thick. The cartridge includes a peripheral frame, generally the shape of three quarters of a rectangle, that is, about half of two sides and the included corner are nonexistent. The frame supports a pair of stainless steel walls on each side of a disk centered therewithin, the double stainless steel walls giving the cartridge extreme rigidity and also providing magnetic shielding to the disk. The walls and frame define a window extending about 90° around the periphery of the rectangle and inwardly almost to the hub of the disk to expose the ring shaped read/write areas on opposite sides of the disk. A shutter is mounted to pivot between a closed position where the disk is totally enclosed, and an open position where free access is provided for read/write heads through the window. The shutter has an outer periphery, with two inwardly extending walls which extend between the inner/outer sheets on both sides. The shutter and the housing interact to provide labyrinth seals to prevent contamination from entering the interior of the housing and damaging the disk. The sidewalls of the shutter, like the cartridge walls, preferably are made from thin stainless steel for rigidity and also to provide magnetic shielding. The arcuate shaped outer periphery is concentric with the outer cylindrical edge of the disk so that it can retract within the housing in a minimal space. By having an entire corner of the cartridge openable without sidewalls to interfere with the action of the read/write heads of the disk drive, and by using a rigid double wall construction, the cartridge can be extremely thin, requiring little clearance for the disk.

One of the pairs of housing walls includes a hub hole therethrough so that the hub of the disk can be engaged by a spindle which is extended into magnetic contact therewith when the cartridge is inserted in the disk drive. Abutment surfaces are provided on the hub and about the hub hole for securing the disk in a stable position when it is removed from the disk drive. Biased wedges force the abutment surfaces together as the cartridge is being removed from the disk drive to retain it in a safe secure position. The biased wedges are released as the cartridge is inserted in a disk drive.

The present invention provides means to secure the disk hub in a suitable position during drive insertion for engagement by the spindle during the time after the biased wedges are released and before the spindle has engaged the hub, no matter what the orientation of the cartridge or the drive with respect to gravity. The invention includes an outwardly facing ring groove formed about the hub and mating nibs formed at locations about 90° apart about the hub hole. When the disk is being inserted into a disk drive that is not horizontal, when the disk is released by the biased wedges, the lowermost nib catches in the hub ring and retains the hub in a position where it can be engaged by the a center protrusion of the spindle. When engaged, the ring and nib hold the disk at a slight angle to the housing so that the disk contacts the housing at its outer edge outside the media read/write ring.

Thus, it is an object of the present invention to provide a high density data storage device in a minimal envelope that can be used in any orientation with respect to gravity.

Another object is to provide a user friendly insertion and ejection interface between a hard disk cartridge and a disk drive which is economical to manufacture, reliable in service and which requires almost no electrical power.

Another object is to provide a manually insertable removable hard disk cartridge and the interface mechanism therefore whose orientation with respect to gravity need not be controlled.

Another object is to provide a removable hard disk cartridge and a disk drive having movement restraint means which allows both to be extremely thin and small without reducing reliability of the disk.

These and other objects and advantages of the present invention will become apparent to those skilled in the art after considering the following detailed specification, together with the accompanying drawings, wherein:

BRIEF DESCRIPTION OF THE DRAWINGS

FIG. 7A is an enlarged cross-sectional view taken on line 7A—7A in FIG. 6A, showing the interaction between the disk and disk restraint means;

FIG. 7B is an enlarged cross-sectional view of a portion of the disk restraint means in the released position;

FIG. 8A is an edge view of the present cartridge with its shutter and disk removed;

FIG. 8B is a cross-sectional edge view of the present cartridge with its disk and shutter removed;

FIG. 9A is an enlarged cross-sectional edge view of the cartridge hub area and the disk drive spindle when the disk is just been released by the disk restraint means during disk insertion;

FIG. 9B is a greatly enlarged fragmentary view of an area of FIG. 9A;

FIG. 10A is an enlarged cross-sectional view taken a moment later than is shown in FIG. 9A;

FIG. 10B is a greatly enlarged fragmentary view of an FIG. 10A;

FIG. 11A is an enlarged cross-sectional view similar to FIG. 10A an instant later with the hub restrained in position to be engaged by the disk drive spindle;

FIG. 11B is a greatly enlarged fragmentary view of FIG. 11A;

FIG. 12A is an enlarged cross-sectional view similar to FIG. 11A as the disk drive spindle first makes contact with the disk hub during a disk insertion;

FIG. 12B is a greatly enlarged fragmentary view of FIG. 12A; and

FIG. 13A is an enlarged cross-sectional view similar to FIG. 12A with the spindle fully engaged with the hub;

FIG. 13B is a greatly enlarged fragmentary view of FIG. 13A;

DETAILED DESCRIPTION OF THE SHOWN EMBODIMENT

Figure 1:
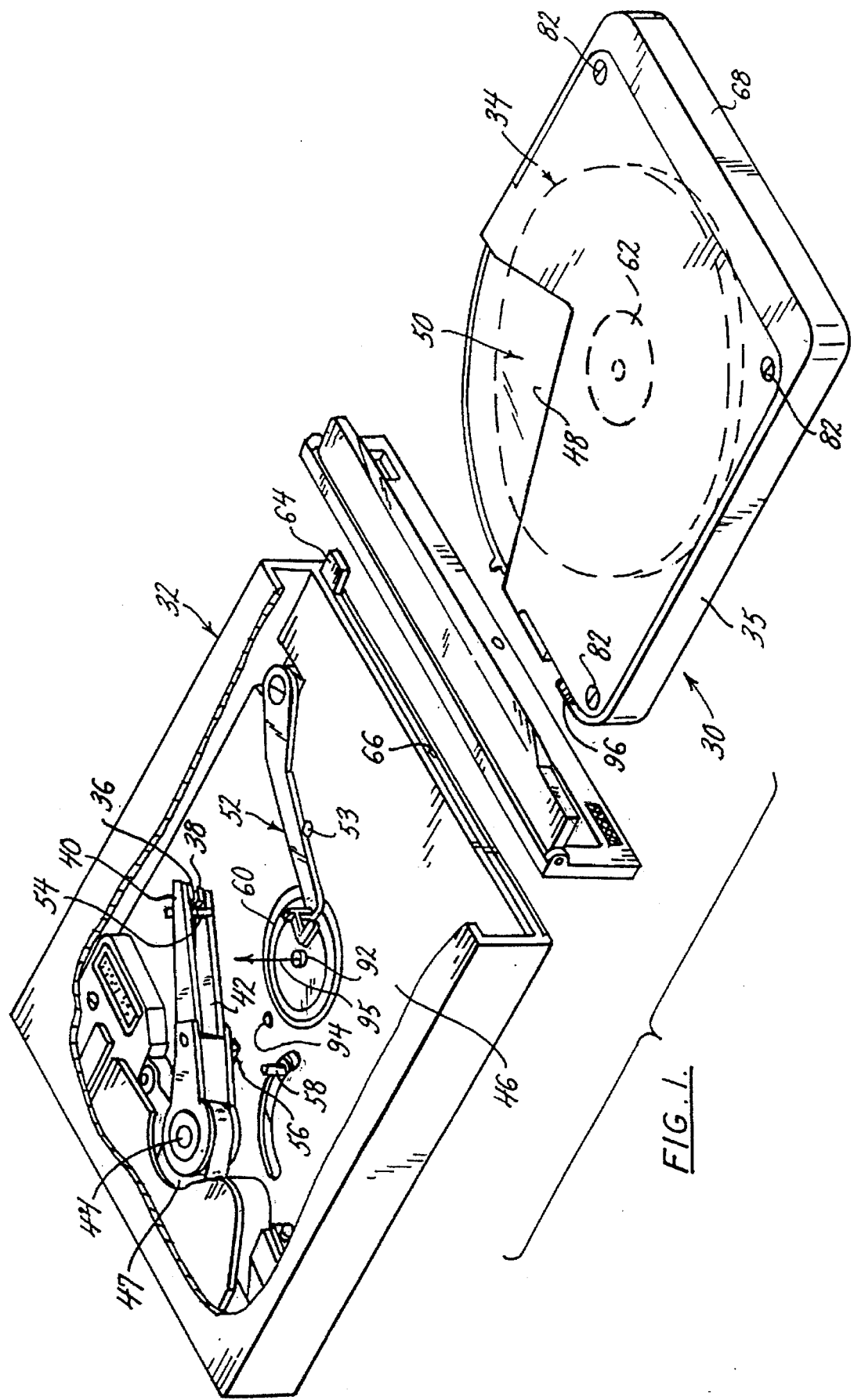
FIG. 1 is a partially cutaway perspective view of the cartridge of the present invention in position to be inserted into a disk drive.

Referring to the drawings more particularly by reference numbers, number 30 in FIG. 1 refers to a hard disk cartridge constructed according to the present invention. Such cartridges store digital data in magnetic media, although the cartridge 30 could be used with flexible magnetic media or optical media. The removable cartridge 30 is for use with the disk drive 32. In FIG. 1, the cartridge 30 is shown positioned for insertion into the disk drive 32. Although the cartridge 30 is shown in its normal horizontal position, and hereinafter unless otherwise stated, such positioning is assumed, the cartridge 30 and disk drive 32 can be used in any orientation with respect to gravity. The cartridge includes a disk 34, which is surrounded by a housing 35 to prevent physical damage or contamination thereof. Since data is placed on very small areas of the disk 34 with great precision, contamination, such as 0.1 to 0.3 micron particles, can quickly destroy the capability of the disk 34 to store data and damage the heads 36 and 38, used to read and write the data. Therefore, the housing 35 completely surrounds the disk 34 when the cartridge 30 is outside the drive 32 and exposed to the elements, as shown in FIG. 1. However, for use, the disk 34 must be accessible to the read/write heads 36 and 38 in the drive 32. The heads 36 and 38 are positioned at the ends of arms 40 and 42, respectively, which rotate together about a pivot 44 on the base 46 of the drive 32 and are driven by a rotary voice coil actuator 47.

Figure 2:
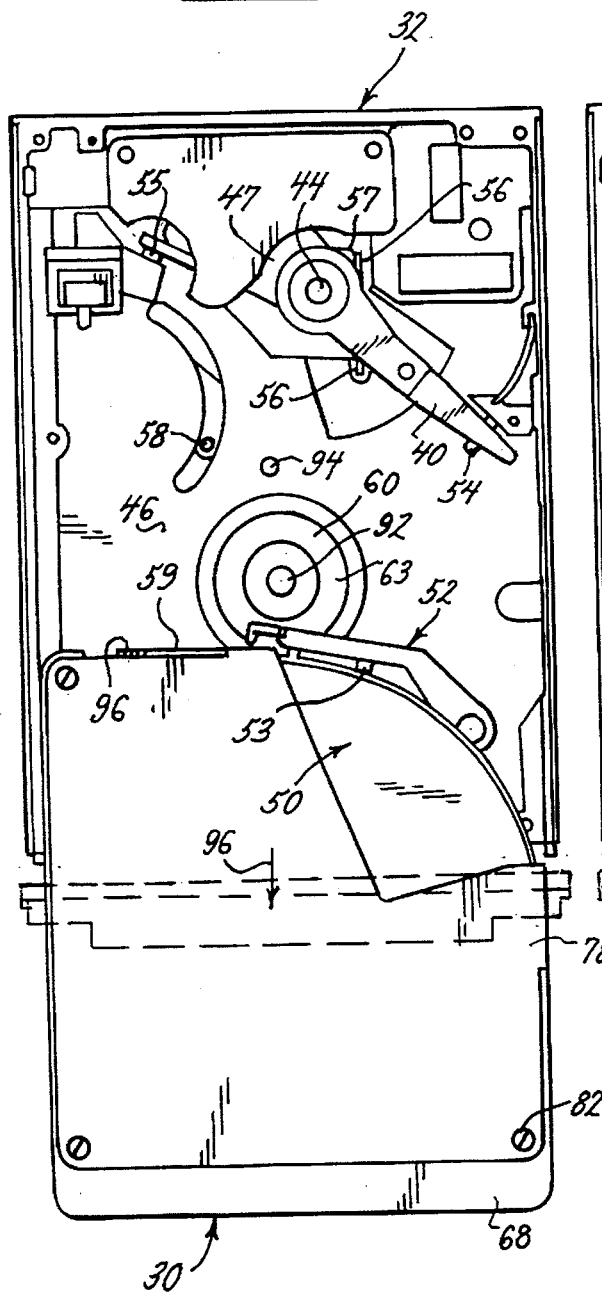
FIG. 2 is a top plan view of the disk drive of FIG. 1 with its top cover removed and a cartridge partially inserted therein.
Figure 3:
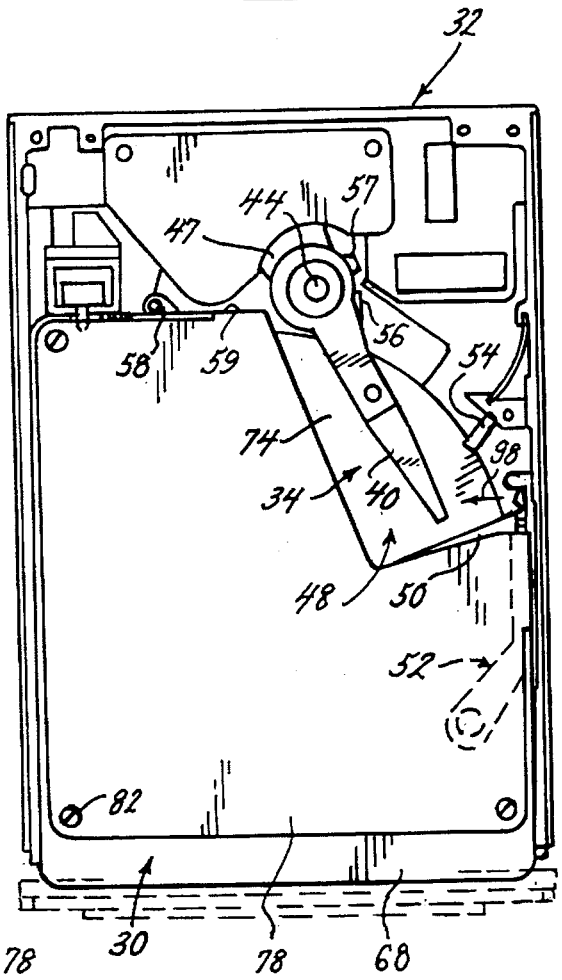
FIG. 3 is a top plan view similar to FIG. 2 with the cartridge fully inserted in the disk drive and the heads thereof in position to read or write data.

A window 48 in one corner of the housing 35 provides access for the read/write heads 36 and 38 and the arms 40 and 42 of the drive 32. The window 48 normally is covered by a shutter 50 when the cartridge 30 is outside the drive 32. The shutter 50 is biased toward its closed position where it is latched closed. As shown in FIGS. 2 and 3, the shutter 50 is automatically opened during insertion and closed during ejection of the cartridge 30 from the disk drive 32 by a shutter opener arm 52. The shutter opener arm 52 normally is biased against a stop 53 so that it tends to remain in the ready position shown in FIG. 1. The cartridge 30 is inserted in the drive 32 by application of manual insertion force on the cartridge 30. As the cartridge 30 is being inserted, the arm 52 engages the shutter 50 when the cartridge 30 is in the partially inserted position shown in FIG. 2. Thereafter the shutter opener arm 52 unlatches the shutter 50 and opens it as the cartridge 30 moves to the fully inserted position shown in FIG. 3. When the shutter 50 has been opened, the arms 40 and 42 can position the heads 36 and 38 anywhere in the data storage area of the disk 34 for read and write operations. It should be noted that normally the arms 40 and 42 are parked and magnetically retained on a double sided ramp 54 by a magnet 55 to prevent damage due to impact to the drive 32. When a cartridge 30 is not in the drive 32, the arms 40 and 42 are locked on the ramp 54 by a retention lever 56. The lever 56 contacts a cam 57 on the actuator 44 to maintain the arms 40 and 42 on the ramp 54 in the locked positions shown until the cartridge 30 is nearly fully inserted in the disk drive 32. Then movement of an insertion/ejection pin 58, positioned for engagement with the back edge 59 of the housing 35 and mechanically linked to the lever 56, moves the lever 56 out of its locking position.

When the cartridge 30 is fully inserted within the drive 32, the spindle 60 thereof, is extended into engagement with the hub 62 of the disk 34. The spindle 60 includes a ring 63 of permanently magnetized material. The hub 62 is constructed from material susceptible to magnetic attraction and magnetically engages with the spindle 60 when they are moved close to each other. Thereafter, the spindle 60 rotates the disk 34 as is required for operation.

The cartridge 30 can be ejected from the drive 32 by software commands, through the use of a manual eject button 64, or by inserting a pin in an emergency eject hole 66 to directly move the release mechanism within the drive 32. When released, spring energy stored when the cartridge 30 was inserted is applied to the pin 58, which moves the cartridge 30 partially out of the drive 32 to a position where it can be manually removed therefrom. The ejection is also assisted by spring energy stored when the shutter 50 and the shutter opener arm 52 were pivoted during insertion. Because of the angles involved, the force of this spring energy acts to eject the cartridge 30 most strongly near the end of the ejection cycle.

The areas of the disk 34 on which data is written and read are never supposed to come into physical contact with other structure, because such physical contact causes damage to the very carefully applied magnetic material thereon. It is the prime function of the housing 35 and the shutter 50 to assure that no such contact ever occurs, yet allow free access by the read/write heads 36 and 38 and the arms 40 and 42.

Figure 4:
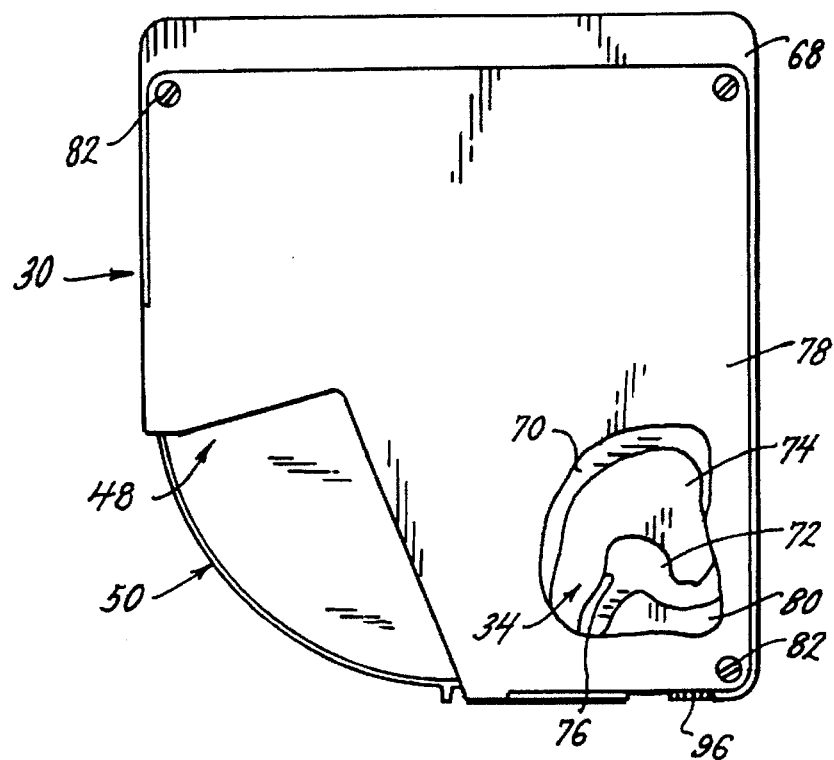
FIG. 4 is a top plan view of the cartridge of the present invention with its shutter in its closed position.
Figure 5:
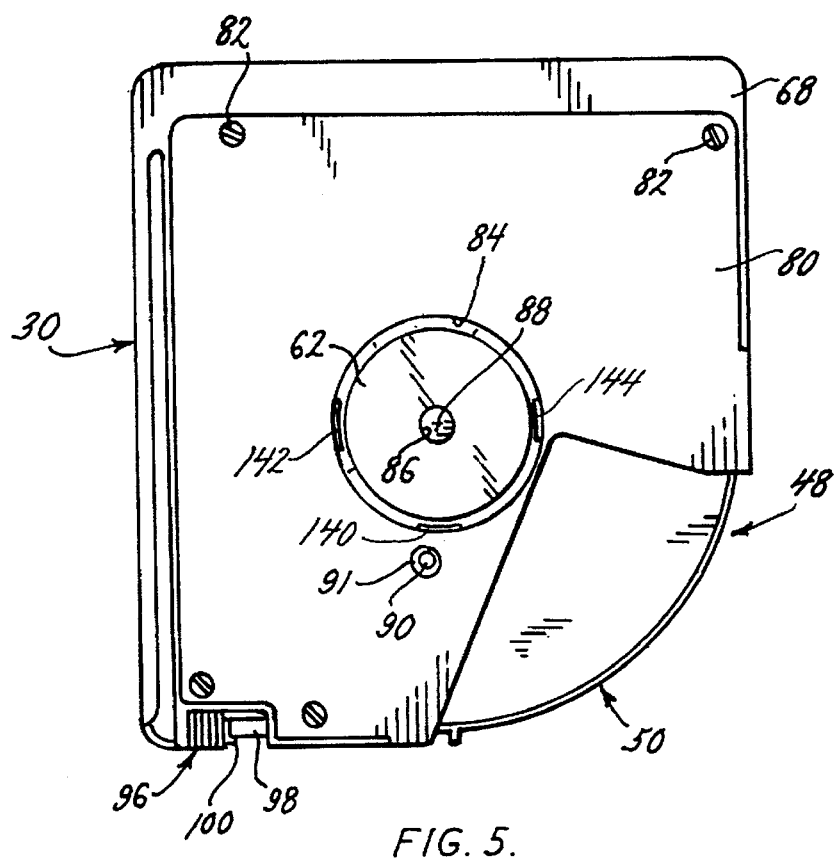
FIG. 5 is a bottom plan view of the cartridge of FIG. 4.

The cartridge 30 is shown in top plan view in FIG. 4 and in bottom plan view in FIG. 5. The housing 35 thereof includes a peripheral frame 68 which extends about 270° around the disk 34. An upper inner sheet 70 and a lower inner sheet 72 are attached to the frame 68, spaced from and generally parallel to, the upper and lower surfaces 74 and 76 of the disk 34. The upper and lower inner sheets 70 and 72 are permanently secured to the frame 68 by means such as screws, glue or fusion. The frame 68 also has upper and lower outer sheets 78 and 80 connected thereto by means such as the screws 82, although like the inner sheets 70 and 72, the outer sheets 78 and 80, may be glued or fused to the frame 68. The outer sheets 78 and 80 also may be formed as the end portions of a single U shaped member. Normally the frame 68 is constructed from plastic material, whereas the sheets 70, 72, 78 and 80 are preferably constructed from a strong magnetic shielding material, such as stainless steel. The double wall stainless steel construction tied together by the peripheral frame 68 provides a rigid housing 35 to prevent the aforementioned flexing, which might otherwise allow contact between the disk surfaces 74 or 76 and the inner sheets 70 or 72. The rigidity enables the housing 35 to be very thin with very small, internal clearances, while preventing disk damage under all but the most abusive conditions.

As shown in FIG. 5, the lower inner and outer sheets 72 and 80, define a hub hole 84 through which the hub 62 of the disk 34 extends. The hub 62 includes a cylindrical centering orifice 86 aligned with the normal rotational axis 88 of the disk 34. The orifice 86, in combination with a cylindrical locating hole 90 with a chamfered outer end 91 that also extends through the lower outer sheet 80, allows the drive 32 to precisely maintain the position of the disk 34 within the housing 35 as the disk 34 is spun by the spindle 60 as shown in FIG. 1. The spindle 60 includes a protrusion 92 with a chamfered outer end 93 which engages the orifice 86, when the spindle 60 is raised in its operating position after the cartridge 30 is fully inserted. Both the spindle 60 and a locating pin 94 move upwardly in the direction of arrow 95 (FIG. 1) when the cartridge 30 is fully seated within the drive 32 to complete the positioning process. The chamfered outer end 91 assists in seating the locating pin 94 within the cylindrical locating hole 90 while the chamfered outer end 93 assists in seating the spindle protrusion 92 in the orifice 86.

Figure 6A:
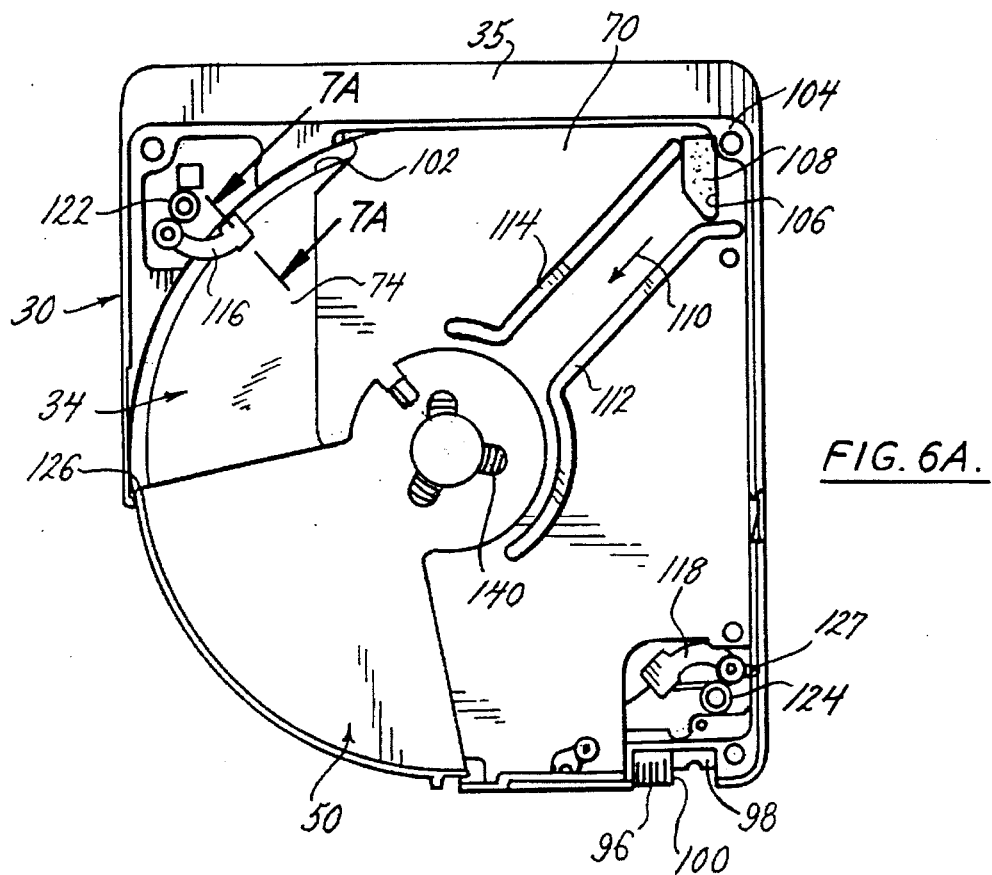
FIG. 6A is a top plan cross-sectional view of the cartridge of FIGS. 4 and 5, with its top cover sheet removed showing positioning and details of disk restraint means therein.
Figure 6B:
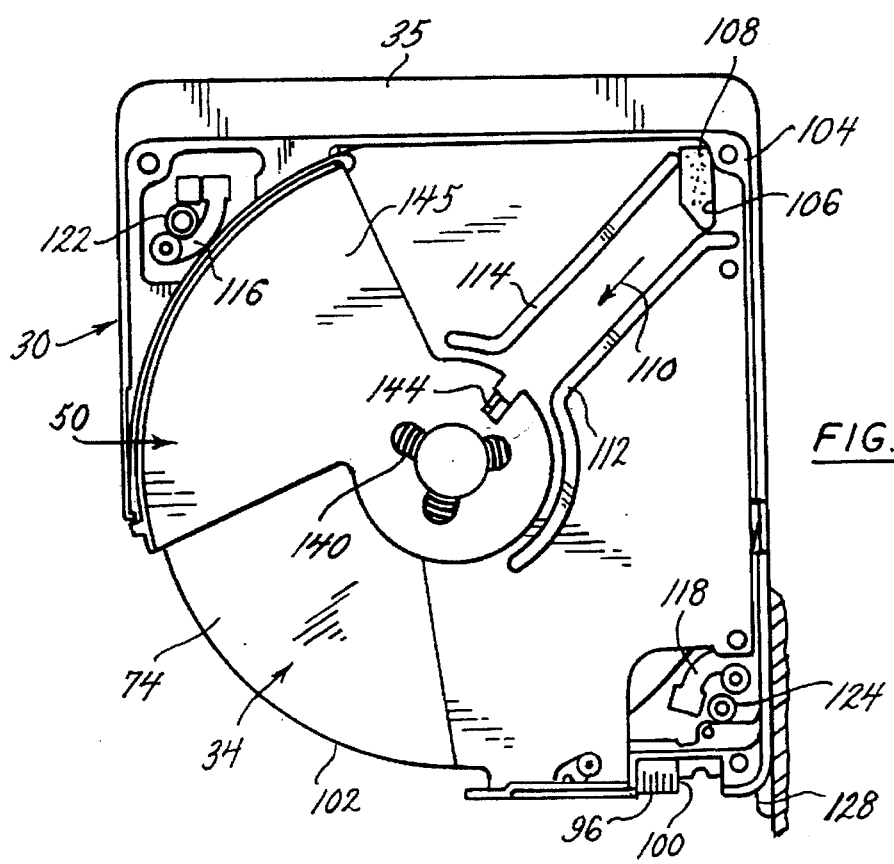
FIG. 6B is a top plan view similar to FIG. 6A but with the shutter in its open position.

The housing 35 also includes a write protect slider 96, which is retained on a track 98 having a ridge 100 there across to establish two stable positions of the slider 96, either the position shown in FIGS. 4 and 5 wherein writing would normally be enabled, or the position shown in FIGS. 6A and 6B where disk writing is prohibited.

When the disk 34 is spinning, the viscous effects of air boundary layers adjacent its upper and lower surfaces 74 and 76, force air outwardly causing a relatively low pressure area to form about the axis 88 of the disk with high pressure areas being generated adjacent to the edge 102 of the disk 34. Some of the high pressure air is entrapped in the corner 104 of the cartridge 30 opposite the shutter window 48. Each of the inner sheets 70 and 72 of the cartridge 30 include a sidewardly facing passageway 106, which retains a filter element 108. The filter element 108 is sized to remove particles as small as 1.5 microns. Air, having been forced by pressure difference through and cleaned by the filter element 108, then flows as shown by arrow 110 back toward the axis 88 for recirculation. To assure proper flow, guide walls 112 and 114 are positioned between the inner and outer sheets 70 and 78, and 72 and 80, which extend from the filter element 108 toward the axis 88. The walls 112 and 114 usually are constructed from strips of plastic which in addition to guiding air, assure proper spacing of the sheets 70 and 78, and 72 and 80 to allow pivoting of the shutter 50.

When the cartridge 30 is not in use, it is desirable to restrict movement of the disk 34 therewithin to assure that impact forces applied to the cartridge 30 do not momentarily cause the surfaces 74 and 76 of the disk to come in contact with either of the inner sheets, 70 or 72. Therefore, disk immobilizing means (a type of disk retention means) are provided. The disk immobilizing means include a pair of arms 116 and 118 pivotally mounted to the frame 68. As shown in FIG. 7A with respect to arm 116, each arm 116 and 118 has a generally wedge shaped tip 120 with a flat surface 121 of a much lower angle thereon. The tips 120 move into engagement with the edge 102 of the disk 34 to force it downwardly toward the lower inner sheet 72, when the cartridge 30 is removed from the drive 32. Each arm 116 or 118 is biased to that position by a spring 122 or 124, respectively. The flat surface 121 is to prevent a user from being able to push on the hub 62 and back drive the arms 116 and 118 against the biasing of the springs 122 and 124 to release the disk 34.

Of course, the arms 116 and 118 must be disengaged from the edge 102 of the disk 34 before the disk 34 is spun. In the case of arm 116, it is positioned to be engaged by the inner edge 126 of the shutter 50 when the shutter 50 is pivoted from its closed position shown in FIG. 6A, to its open position shown in FIG. 6B. The opening movement of the shutter 50 forces the arm 116 back against its spring 122 and removes the tip 120 from engagement with the edge 102 of the disk 34. The other arm 118 includes a back side lever 127, which, as clearly shown in FIG. 7B, engages and is rotated by a guide rail 128 within the disk drive 32 as the cartridge 30 is inserted therein. The lever 127 rotates the arm 118 in the direction of arrow 130 so that its tip 120 is also removed from the edge 102 of the disk 34. When the cartridge 30 is removed from the disk drive 32, the shutter 50 closes, disengaging it from the arm 116 which rotates back to the position shown in FIG. 6A. At the same time, the rail 128 disengages from the lever 127, so that the spring 124 forces the tip 120 of the arm 118 back in engagement with the edge 102 of the disk 34 to force the disk 34 downwardly. The two arms 116 and 118 are positioned at opposite corners of the cartridge 32 to evenly force the disk 34 downwardly so that it does not tip or jam.

As shown in FIGS. 8A and 8B and FIGS. 9A and 9B, the disk hub 62 includes a frusto-conical disk parking abutment surface 132 about its periphery and the hub hole 84 in the lower inner and outer sheets 72 and 80 has a plastic abutment ring 136 therein, which includes a frusto-conical housing radial abutment surface 138 facing the abutment surface 132 for engagement therewith. When the disk 34 is forced downwardly by the arms 116 and 118, the surfaces 132 and 138 assure centering of the hub 62 within the hub hole 84 ready for engagement by the chamfer 93 about the end of the protrusion 92 which leads the hub centering orifice 86 onto the protrusion 92.

When the cartridge 30 is inserted in a disk drive 32 that does not have a horizontal orientation, it is possible that the disk 34 undesirably will move sidewardly in the housing 35 between the time it is immobilized by the arms 116 and 118, and the time it is engaged by the spindle 60. Therefore, as shown in FIG. 5, nibs 140, 142 and 144 are formed on the abutment ring 136 facing inwardly and extending from the radial abutment surface 138 to engage an outwardly facing concentric groove 146 in the abutment surface 132 to retain the hub 62 until the spindle 60 engages the hub 62 (the combination of nibs 140, 142, and 144 and the groove 146 forming disk retaining means).

FIGS. 9A and 9B show the position of the disk 34 when it is immobilized with the abutment surfaces 132 and 138 in full engagement to center the hub 62 for engagement by the spindle 60. As the cartridge 30 is inserted in the disk drive 32, the arms 116 and 118 release the disk 72. If the cartridge 30 is in a horizontal position with the hub 62 facing downwardly, the abutment surfaces 132 and 136 remain engaged and the hub 62 remains centered. However, if the drive 32 has a vertical orientation, the disk 34 tends to move downwardly out of a center position as shown in FIGS. 10A and 10B. If the disk 34 was allowed to fall too far, then the chamfer 93 on the spindle protrusion 92 would be insufficient to engage and center the cylindrical centering orifice 86 of the hub 62 and an insertion failure could result.

Therefore, as shown in FIG. 5 nibs 140, 142 and 144 are formed on the abutment ring 136 facing inwardly and extending from the radial abutment surface 138 to engage an outwardly facing concentric groove 146 in the abutment surface 132 to retain the hub 62 on insertion after the arms 116 and 118 have disengaged the disk 34 and before the spindle 60 engages the hub 62 with its protrusion 92 in the orifice 86. Nib 140 is shown in FIGS. 9A and 9B through 13A and 13B. As shown, the groove 146 is cut into the surface 132 and includes an inwardly facing frusto-conical surface 148, an outwardly facing frusto-conical surface 150 and a partial toroidal surface 152 there between. Each nib, 140 being shown, extends along the abutment surface 138 through a short arc. The nib 140 includes an outer abutment surface 154, an inner abutment surface 156, both of which being segments of a frustum, and an apex 158 there between. As shown in FIG. 10B, when the disk 34 is released in vertical position, the surfaces 148 and 154 come into engagement to restrict further downward travel 160 of the disk 34. The nibs 140, 142, and 144 are placed about the abutment surface 138 in positions to catch the groove 146 in all expected orientations of the drive 32. Since normally only three vertical orientations are used, only three nibs, 90° apart, need be provided. However, if the drive 32 is to be used in a notebook computer, any possible vertical orientation may be possible and therefore a fourth nib (not shown) may be included, the nibs in that instance being located at 90° locations around the abutment surface 138.

As shown in FIG. 11A, once the nib 140 has caught in the groove 146, the disk 34 moves to a slight angle where its outer non-data containing edge 162 engages a pad 164 mounted on the inner housing side 72 with one pad 164 being positioned radially outwardly from each nib to work in cooperation therewith. Therefore, the disk 34 is held in a position where its centering orifice 86 can be engaged by the chamfer surface 93 as shown in FIG. 12A. As the chamfer surface 93 centers the disk 34, the groove 146 is lifted out of the engagement with the nib 140 and as shown in FIG. 13A, the hub 62 fully engages with the spindle 60. It should be noted that the height of the each of the nibs 140, 142, and 144 is such that there is clearance 166 between the apexes 158 of the nibs 140, 142, and 144 and the outer edge 168 of the groove 146, even when nibs 142 and 144 are 180° apart.

Therefore, nibs can be placed apart with any spacing that is desired including a complete ring and not interfere with the proper seating of the abutment surfaces 132 and 138. As shown in FIGS. 9A through 13A, a nib opposite the locating orifice 90 need not be present in most installations since that would imply a disk drive 32 that ejects its cartridge 30 downwardly, an unlikely situation except in the aforementioned notebook computers.

Figure 15:
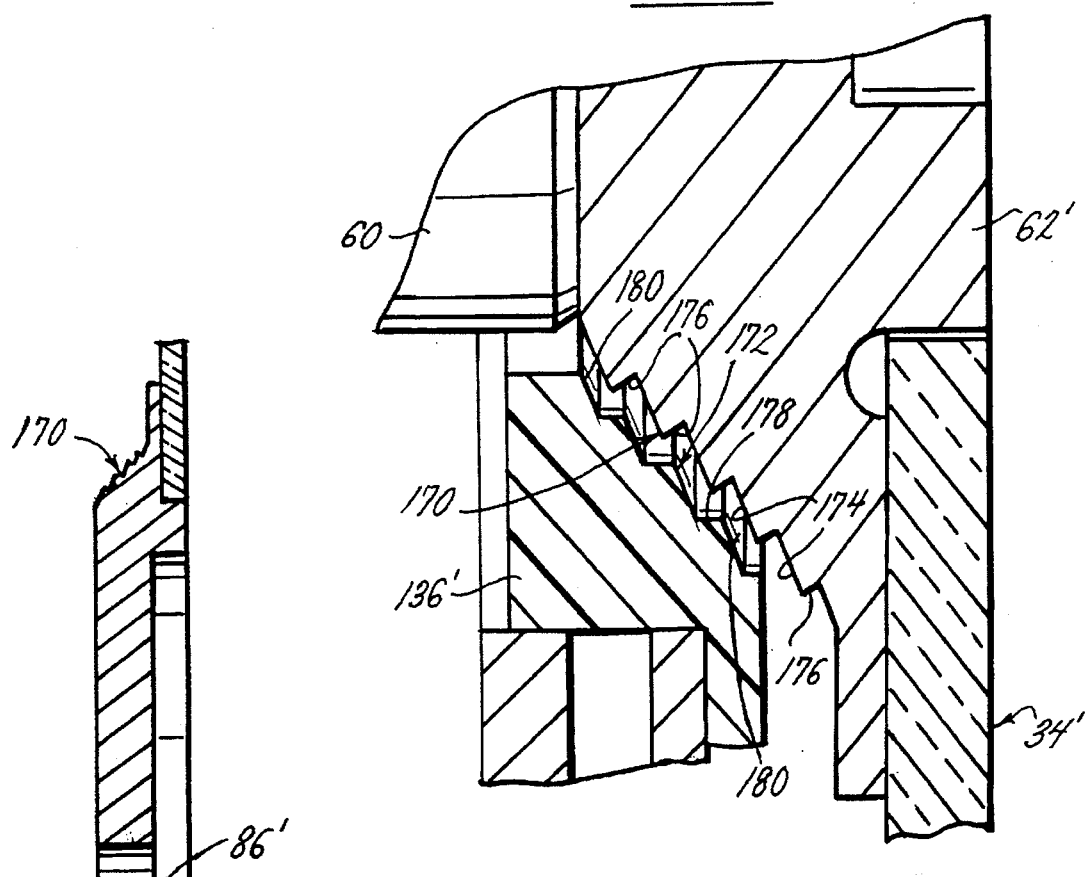
FIG. 15 is a greatly enlarged view of the serrated frusto-conical edge of FIG. 14 shown in position with a cross-section of a modified cartridge hub area having mating serrations.
Figure 14:
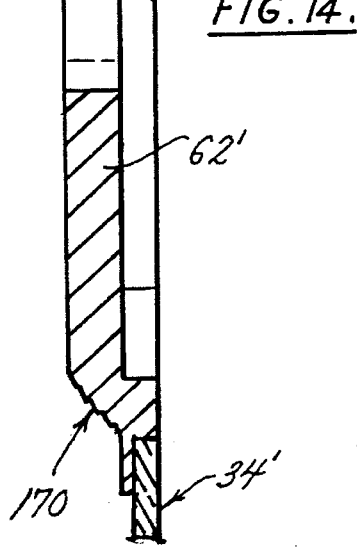
FIG. 14 is an enlarged cross-sectional view of a modified disk drive spindle having a serrated frusto-conical edge.
Figure 16:
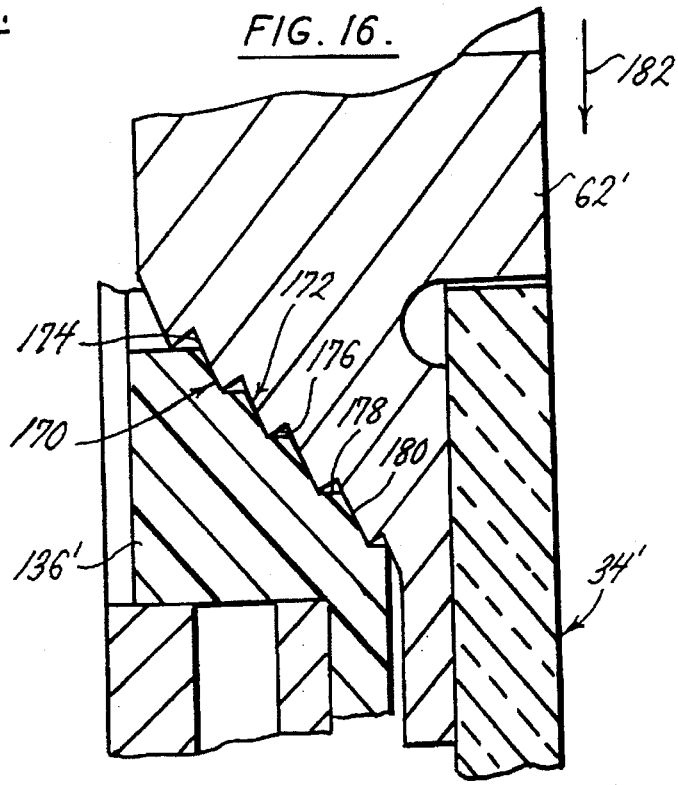
FIG. 16 is an enlarged view similar to FIG. 15 showing how the serrations on the modified hub and modified spindle engage to insure the disk remains relatively centered in the hub area.

In FIGS. 14 through 16, similar, but modified structure to that found in FIGS. 1 through 13B is indicated by the same number with a prime (') added. FIG. 14 is an enlarged cross-sectional view of a modified disk hub 62'. As can be seen, the hub 62' includes a frusto-conical serrated outer edge 170. As shown in FIG. 15, the serrated frusto-conical edge 170 is positioned facing a similarly serrated, frusto-conical edge 172 on the plastic abutment ring 136'. The edge 170 includes frusto-conical ring surfaces 174 at about 30° to vertical (as orientated in FIG. 15 and frusto-conical ring surfaces 176 at about 70° to vertical. The edge 172 includes cylindrical ring surfaces 178 at about 90° to vertical, positioned for off center movement restricting abutment with the frusto-conical surfaces 176. The edge 172 also includes frusto-conical ring surfaces 180 between the cylindrical ring surfaces 178 at about 30° to vertical for sliding parallel contact with surfaces 174. When the spindle 60 is properly engaged with the hub centering orifice 86', the serrated edges 170 and 172 move past each other without interference. However, as shown in FIG. 16, when the cartridge 30' is inserted in the vertical position of FIGS. 14, 15 and 16 and the disk 34' is released, the surfaces 176 and 178 of the serrated edges 170 and 172 engage as shown in FIG. 16 to prevent excessive off center movement of the disk 34' in the direction of arrow 182 so that the spindle 60 can properly engage the hub 62'. Since the surfaces 178 are cylindrical, the spindle 60 can push the hub 62' out of engagement without danger that the edges 170 and 172 will lock together, yet having a 20° angle between the abutting surfaces 176 and 178, assures substantial friction at the small arcs of contact therebetween to properly retain the edges 170 and 172 together during insertion of the cartridge 30'.

Thus, there has been shown and described novel means to assure engagement of removable storage media with a disk drive, which fulfills all the objects and advantages sought therefor. Many changes, alterations, modifications and other uses and applications of the subject means will become apparent to those skilled in the art after considering the specification, together with the accompanying drawings. All such changes, alterations and modifications which do not depart from the spirit and scope of the invention are deemed to be covered by the invention, which is limited only by the claims that follow:

We claim:

1. A cartridge for a data storage disk drive including:
   a disk having:
      an outer edge; and
      a central hub for engagement with a disk drive spindle;
   a housing containing said disk, said housing including:
      first and second opposite housing side portions, said second housing side portion having:
         an opening for said hub therein;
      disk retention means to urge said disk toward said second housing side portion when said cartridge is not inserted into a data storage disk drive; and
      disk retaining means to retain said hub to said housing when said housing is in a generally vertical orientation, said disk retention means are not urging said disk toward said second housing side portion, and said cartridge is being inserted into a data storage disk drive, said disk retaining means including:
         a first serrated edge on said central hub; and
         a second serrated edge on said opening facing said first serrated edge to engage said first serrated edge and retain said hub generally centered in said second housing side portion opening for engagement with a disk drive spindle, wherein said first serrated edge includes:
            a first plurality of frusto-conical ring surfaces; and
            a second plurality of frusto-conical ring surfaces positioned between said first plurality of frusto-conical ring surfaces, and wherein said second serrated edge includes;
            a plurality of cylindrical ring surfaces positioned to engage said first plurality of frusto-conical ring surfaces; and
            a third plurality of frusto-conical ring surfaces positioned between said plurality of cylindrical ring surfaces and generally parallel to said second plurality of frusto-conical ring surfaces.

2. A cartridge for a data storage disk drive including:
   a disk having:
      an outer edge; and
      a central hub for engagement with a disk drive spindle, said central hub having:
         a frusto-conical disk parking abutment surface;
   a housing containing said disk, said housing including:
      first and second opposite housing side portions, said second housing side portion having:
         an opening for said hub therein; and
         an abutment member about said opening including:
            a frusto-conical housing abutment surface facing said frusto-conical disk parking abutment surface and positioned for engagement therewith;
      disk retention means to urge said disk toward said second housing side portion when said cartridge is not inserted into a data storage disk drive; and
      disk retaining means to retain said hub to said housing when said housing is in a generally vertical orientation, said disk retention means are not urging said disk toward said second housing side portion, and said cartridge is being inserted into a data storage disk drive, said disk retaining means including:
         a ring shaped groove in said frusto-conical disk parking abutment surface;
         at least one radially inwardly facing nib formed on said frusto-conical housing abutment surface facing said frusto-conical disk parking abutment surface for positioning below said ring shaped groove for engagement therewith to retain said hub generally centered in said second housing side portion opening for engagement with a disk drive spindle; and
         at least one abutment pad in radial alignment with said at least one nib positioned for contact with said disk outer edge when said at least one nib and said ring shaped groove are engaged.

3. The cartridge as defined in claim 2 wherein said at least one nib is at least three nibs positioned on said frusto-conical housing abutment surface about 90° apart.

4. The cartridge as defined in claim 2 wherein said ring shaped groove includes:
   a first frusto-conical surface at a first predetermined angle and extending inwardly from said frusto-conical disk parking abutment surface; and a second frusto-conical surface at a second predetermined angle, said at least one nib including:
a first nib surface facing said first frusto-conical surface for engagement therewith.

5. The cartridge as defined in claim 4 wherein said at least one nib further includes:
a second nib surface generally facing said second frusto-conical surface; and
a radially inwardly facing apex between said first and second nib surfaces, wherein said at least one nib is at least two nibs facing each other, said apexes of said at least two nibs being spaced apart a distance greater than the largest diameter of said first frusto-conical surface so that said hub can move inwardly and outwardly there past.

6. A cartridge for a data storage disk drive including:
a disk having:
an outer ring portion for storing data;
an outer edge;
a center portion having;
an axis about which said disk is rotatable; and
a hub;
a housing containing said disk, said housing including:
a housing peripheral edge portion;
first and second housing side portions defining a window area for access to said disk;
a shutter mounted to said housing having:
an open position; and
a closed position;
disk retention means to urge said disk toward said second housing side portion when said shutter is in said closed position; and
disk retaining means to retain said hub to said housing when said housing is in a generally vertical orientation, said disk retention means are not urging said disk toward said second housing side portion, and said cartridge is not fully inserted in a data storage disk drive, wherein said second housing side portion includes:
an opening in which said hub extends and said disk retaining means include:
a first serrated surface on said hub; and
a second serrated surface on said opening facing said first serrated surface for engagement therewith to retain said hub generally centered in said second housing side portion opening for engagement with a disk drive spindle, wherein said first serrated surface includes:
a first plurality of frusto-conical ring surfaces; and
a second plurality of frusto-conical ring surfaces positioned between said first plurality of frusto-conical ring surfaces and wherein said second serrated surface includes:
a plurality of cylindrical ring surfaces positioned to engage said first plurality of frusto-conical ring surfaces; and
a third plurality of frusto-conical ring surfaces positioned between said plurality of cylindrical ring surfaces and generally parallel to said second plurality of frusto-conical ring surfaces.

7. A cartridge for a data storage disk drive including:
a disk having:
an outer ring portion for storing data;
an outer edge;
a center portion having;
an axis about which said disk is rotatable; and
a hub including:
a frusto-conical disk parking abutment surface; and
at least one ring shaped groove in said frusto-conical disk parking abutment surface;
a housing containing said disk, said housing including:
a housing peripheral edge portion;
first and second housing side portions defining a window area for access to said disk, said second housing side portion including:
an opening in which said hub extends; and
an abutment member about said opening including:
a frusto-conical housing abutment surface facing said frusto-conical disk parking abutment surface and positioned for engagement therewith;
a shutter mounted to said housing having:
an open position; and
a closed position;
disk retention means to urge said disk toward said second housing side portion when said shutter is in said closed position;
disk retaining means to retain said hub to said housing when said housing is in a generally vertical orientation, said disk retention means are not urging said disk toward said second housing side portion, and said cartridge is not fully inserted in a data storage disk drive, said disk retaining means including:
means for engaging said at least one ring shaped groove formed on said frusto-conical housing abutment surface facing said frusto-conical disk parking abutment surface of said hub positioned underneath said ring shaped groove for engagement therewith to retain said hub generally centered in said second housing side portion opening for engagement with a disk drive spindle, wherein said ring shaped groove includes:
a first frusto-conical surface at a first predetermined angle generally facing said outer ring portion and extending inwardly from said frusto-conical disk parking abutment surface; and
a second frusto-conical surface at a second predetermined angle generally facing away from said outer ring portion; and
at least one nib positioned on said frusto-conical housing abutment surface including:
a first nib surface facing said first frusto-conical surface for engagement therewith;
a second nib surface generally facing said second frusto-conical surface; and
a radially inwardly facing apex between said first and second nib surfaces, said housing further including:
abutment pad means positioned in radial alignment with said at least one nib, so that when a nib and said ring shaped groove are engaged, said abutment pad means are positioned for contact with said disk outer edge.

8. The cartridge as defined in claim 7 wherein said at least one nib is at least two nibs facing each other, said apexes of said at least two nibs being spaced apart a distance greater than the largest diameter of said first frusto-conical surface so that said hub can move inwardly and outwardly there past.

9. The cartridge as defined in claim 8 wherein said disk retention means include:
a disk retaining lever pivotally mounted to said housing, said disk retraining lever including:
a first arm having:
a wedge abutment surface positioned for contact with said disk outer edge to urge said disk toward said second housing side portion; and
a second arm extending through said housing peripheral edge portion for actuation to pivot said first arm wedge abutment surface out of contact with said disk outer edge; and
lever biasing means connected to said disk retaining lever to urge said wedge abutment surface of said first arm into contact with said disk outer edge.

10. The cartridge as defined in claim 8 wherein said disk retention means include:
a wedge biased to contact said disk outer edge and to urge said disk toward said second housing side portion when said shutter is in said closed position.

11. The cartridge as defined in claim 8 wherein said disk retention means include:
a disk restraining lever pivotally mounted to said housing, said disk retaining lever including:
a wedge abutment surface positioned for contact with said disk outer edge to urge said disk toward said second housing side portion; and
a second abutment portion positioned for engagement by said shutter when said shutter is in said open position to pivot said disk restraining lever so that said wedge abutment surface is out of contact with said disk outer edge; and
lever biasing means connected to said disk restraining lever to bias said wedge abutment surface into contact with said disk outer edge when said shutter is in said closed position to forcibly restrain said disk.

12. A data storage device including:
a disk drive for removably retaining said removable disk cartridge including:
a spindle for engaging and spinning a disk for data storage; and
a removable disk cartridge having:
a disk for data storage; and
a housing in which said disk can be spun, said housing including:
disk retention means to immobilize said disk when said disk is disengaged from said spindle, said disk including:
a hub for engagement with said spindle; and
at least one hub groove formed about said hub to engage said housing to limit vertical movement of said hub within said housing when said disk retention means are disengaged, said cartridge is generally vertically orientated, and said hub is not engaged with said spindle, wherein said hub includes:
a frusto-conical disk parking abutment surface in which said at least one hub groove is formed, said at least one hub groove being formed in said frusto-conical disk parking abutment surface, and said housing includes:
an opening in which said hub extends; and
an abutment member about said opening including:
a frusto-conical housing abutment surface facing said frusto-conical disk parking abutment surface and positioned for engagement therewith; and at least one radially inwardly facing nib formed on said frusto-conical housing abutment surface facing said frusto-conical disk parking abutment surface of said hub, positioned below said at least one hub groove for engagement therewith to retain said hub generally centered in said housing opening for engagement with said disk drive spindle.

13. The data storage device as defined in claim 12 wherein said at least one nib is at least three nibs positioned on said frusto-conical housing abutment surface at least about 90° apart.

14. The data storage device as defined in claim 12 wherein said at least one hub groove includes:
a first frusto-conical surface at a first predetermined angle extending inwardly from said frusto-conical disk parking abutment surface; and
a second frusto-conical surface at a second predetermined angle with respect to said first frusto-conical surface, said at least one nib including:
a first nib surface facing and generally parallel to said first frusto-conical surface for engagement therewith.

15. The data storage device as defined in claim 14 wherein said at least one nib further includes:
a second nib surface generally facing said second frusto-conical surface; and
a radially inwardly facing apex between said first and second nib surfaces.

16. A data storage device including:
a disk drive for removably retaining said removable disk cartridge including:
a spindle for engaging and spinning a disk for data storage; and
a removable disk cartridge having:
a disk for data storage; and
a housing in which said disk can be spun, said housing including:
disk retention means to immobilize said disk when said disk is disengaged from said spindle, said disk including:
a hub for engagement with said spindle; and
at least one hub groove formed about said hub to engage said housing to limit vertical movement of said hub within said housing when said disk retention means are disengaged, said cartridge is generally vertically orientated, and said hub is not engaged with said spindle, wherein said at least one nib is at least two nibs facing each other, said apexes of said at least two nibs being spaced apart a distance greater than the largest diameter of said first frusto-conical surface so that said hub can move inwardly and outwardly there past.

17. The data storage device as defined in claim 16 wherein said disk retention means include:
a disk retaining member mounted to said housing for movement with respect to said disk, said disk restraining member including:
a wedge abutment surface positioned for contact with said disk;
means to move said wedge abutment surface out of contact with said disk when said cartridge is inserted in said drive; and
biasing means to urge said wedge abutment surface into contact with said disk.

18. A data storage device including:
a disk drive for removably retaining said removable disk cartridge including:
a spindle for engaging and spinning a disk for data storage; and
a removable disk cartridge having:
a disk for data storage; and
a housing in which said disk can be spun, said housing including:
disk retention means to immobilize said disk when said disk is disengaged from said spindle, said disk including:
a hub for engagement with said spindle; and
at least one hub groove formed about said hub to engage said housing to limit vertical movement of said hub within said housing when said disk retention means are disengaged, said cartridge is generally vertically orientated, and said hub is not engaged with said spindle, wherein said hub includes:
a first plurality of frusto-conical ring surfaces one of which forming at least a portion of said at least one hub groove; and
a second plurality of frusto-conical ring surfaces positioned between said first plurality of frusto-conical ring surfaces, and wherein said housing includes:
a plurality of cylindrical ring surfaces positioned to engage said first plurality of frusto-conical ring surfaces; and
a third plurality of frusto-conical ring surfaces positioned between said plurality of cylindrical ring surfaces and generally parallel to said second plurality of frusto-conical ring surfaces.

19. A cartridge for a data storage disk drive including:
a disk having:
an outer ring portion for storing data;
an outer edge;
a center portion having;
an axis about which said disk is rotatable; and
a hub;
a housing containing said disk, said housing including:
a housing peripheral edge portion;
first and second housing side portions defining a window area for access to said disk;
a shutter mounted to said housing having: an open position; and
a closed position;
disk retention means to urge said disk toward said second housing side portion when said shutter is in said closed position; and
disk retaining means to retain said hub to said housing when said housing is in a generally vertical orientation, said disk retention means are not urging said disk toward said second housing side portion, and said cartridge is not fully inserted in a data storage disk drive, said second housing side portion including:
an opening in which said hub extends, said disk retaining means including:
a first serrated surface on said hub; and
a second serrated surface on said opening facing said first serrated surface for engagement therewith to retain said hub generally centered in said second housing side portion opening for engagement with a disk drive spindle, said first serrated surface including:
a first plurality of frusto-conical ring surfaces, and said second serrated surface including:
a plurality of cylindrical ring surfaces positioned to engage said first plurality of frusto-conical ring surfaces.

* * * * *